United States Patent
Liao et al.

(10) Patent No.: US 6,925,919 B2
(45) Date of Patent: Aug. 9, 2005

(54) TABLE SAW WITH A SHAVING COLLECTING MECHANISM

(76) Inventors: Juei-Seng Liao, No. 195, Sec. 1, Nanking E. Rd., Taichung City (TW); Pei-Lieh Chiang, No. 12, Nan-Ping Rd., Nam Dist., Taichung City (TW)

( * ) Notice: Subject to any disclaimer, the term of this patent is extended or adjusted under 35 U.S.C. 154(b) by 98 days.

(21) Appl. No.: 10/676,081

(22) Filed: Oct. 2, 2003

(65) Prior Publication Data

US 2004/0237743 A1 Dec. 2, 2004

(30) Foreign Application Priority Data

May 30, 2003 (TW) ........................................ 92210012 U

(51) Int. Cl.[7] .............................. B26D 7/08; B26D 1/18; B27B 5/00
(52) U.S. Cl. ............................... 83/168; 83/98; 83/167; 83/169; 83/477.1; 83/477.2
(58) Field of Search ............................ 83/98, 99, 100, 83/167, 168, 169, 477.1, 477.2; 144/252.1, 286.1, 286.5, 287

(56) References Cited

U.S. PATENT DOCUMENTS

| | | | | |
|---|---|---|---|---|
| 4,063,478 A | * | 12/1977 | Stuy | 83/100 |
| 4,255,995 A | * | 3/1981 | Connor | 83/100 |
| 6,546,835 B2 | * | 4/2003 | Wang | 83/477.1 |

* cited by examiner

Primary Examiner—Allan N. Shoap
Assistant Examiner—Isaac Hamilton
(74) Attorney, Agent, or Firm—Foley & Lardner LLP

(57) ABSTRACT

A table saw has a height and inclination adjustable saw blade which is mounted on and rotatable with a blade shaft that is driven by a motor. A support seat is movable relative to a mounting frame, and supports the blade shaft. A shaving collecting member is disposed in the vicinity of the saw blade to collect wood shavings. A casing is secured to the support seat, and is communicated with the shaving collecting member. An impeller is disposed rotatably in the casing, and is mounted on a driven shaft that is coupled to the blade shaft so as to permit rotation of the impeller when the motor is in operation, thereby drawing wood shavings from the shaving collecting member to the casing and out of a discharge port in the casing.

5 Claims, 8 Drawing Sheets

TABLE SAW WITH A SHAVING COLLECTING MECHANISM

CROSS-REFERENCE TO RELATED APPLICATION

This application claims priority of Taiwanese Application No. 092210012, filed on May 30, 2003.

BACKGROUND OF THE INVENTION

1. Field of the Invention

This invention relates to a table saw, more particularly to a table saw with a shaving collecting mechanism which is driven by a motor that drives a saw blade.

2. Description of the Related Art

Referring to FIG. 1, in a co-pending U.S. patent application Ser. No. 09/925,346, abandoned on Dec. 30, 2003, entitled "Table Saw", which claims priority of Taiwanese Application No. 092210018, there is provided a table saw 10 which is shown to include a mounting frame 11, a worktable 12 which is turnably mounted on a top end of the mounting frame 11, a support seat 13 which is movably disposed in the mounting frame 11 along a curved sliding path, a transmission unit 14 which is mounted to the support seat 13, a blade unit 15 which is driven by the transmission unit 14, and a height adjusting unit 16 and an inclination adjusting unit 17 which are disposed to respectively adjust a height position and an angular position of a saw blade 151 of the blade unit 15 relative to the worktable 12.

Since a large amount of wood shavings is generated during a sawing operation of the table saw 10, collecting means is needed to collect the wood shavings without obstruction to the adjustment of the angular position of the saw blade 151.

SUMMARY OF THE INVENTION

The object of the present invention is to provide a table saw which has a shaving collecting mechanism that collects wood shavings during a cutting operation and that does not obstruct adjustment of angular position of a saw blade thereof.

According to this invention, the table saw includes a mounting frame having first and second side frame portions spaced apart from each other in a longitudinal direction to define an accommodation space therebetween, a worktable mounted on one of the first and second side frame portions to shield the accommodation space, and a support seat received in the accommodation space. The support seat extends in the longitudinal direction, and terminates at first and second support ends respectively mounted on the first and second side frame portions. The support seat has first and second major surfaces opposite to each other in a transverse direction relative to the longitudinal direction. A motor is swingable relative to the support seat about a swing axis extending in the transverse direction, and has an output shaft disposed to deliver a driving force and extending parallel to the swing axis. A blade shaft defines a blade axis parallel to the swing axis, and is turnable relative to the support seat about a first axis parallel to the blade axis. The blade shaft has a driven end coupled to the output shaft so as to be driven by the driving force to revolve about the blade axis, and a mount end opposite to the driven end along the blade axis. The driven and mount ends are disposed proximate to the first and second major surfaces, respectively. A saw blade is mounted for rotation with the mount end of the blade shaft.

A shaving collecting member is disposed in the vicinity of the saw blade, and cooperates with the second major surface to define a shaving collecting chamber for collecting wood shavings. The shaving collecting chamber has an outlet port.

A casing has a proximate wall provided with an inlet port which is communicated with the output port of the shaving collecting chamber, a distal wall spaced apart from the proximate wall along a second axis parallel to the first axis to define a shaving accommodation chamber therebetween, and a discharge port disposed between the proximate and distal walls and extending radial to the second axis.

A driven shaft is mounted rotatably on the distal wall, and extends along the second axis. The driven shaft has an inner shaft end extending into the shaving accommodating chamber, and an outer shaft end extending from the inner shaft end and outwardly of the distal wall.

A drive transmission unit includes a rotating member which is rotatable relative to the support seat about the first axis, and which is disposed to couple the blade shaft to the outer shaft end of the driven shaft so as to transmit revolving force of the blade shaft to the outer shaft end for rotating the driven shaft about the second axis when the motor is in operation.

An impeller is received in the shaving accommodating chamber, and is driven by the inner shaft end of the driven shaft to rotate about the second axis so as to draw wood shavings from the shaving collecting member into the shaving accommodating chamber and out of the discharge port.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
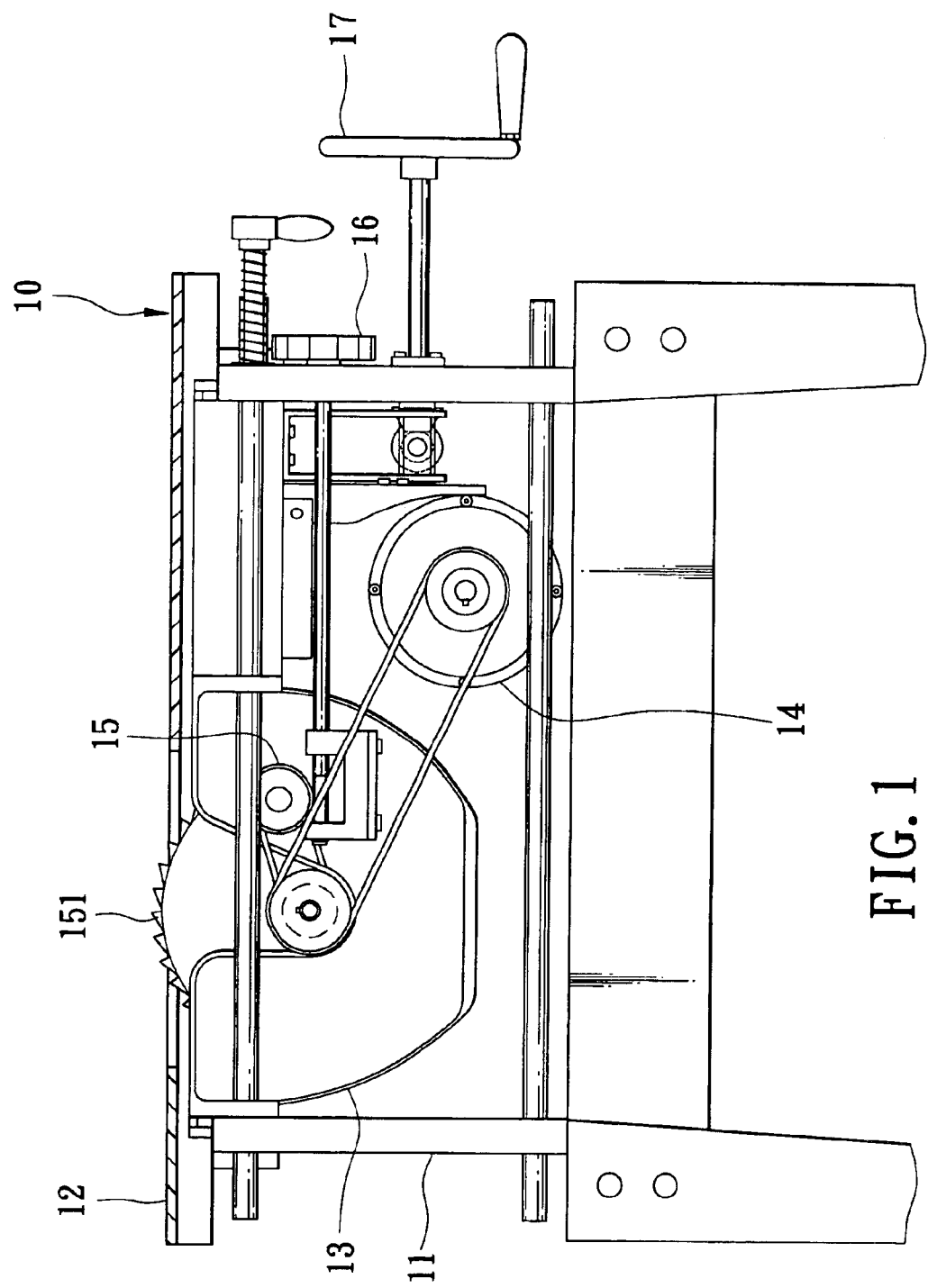
FIG. 1 is a partly sectioned front view of a table saw disclosed in a co-pending U.S. patent application by the applicant.
Figure 2:
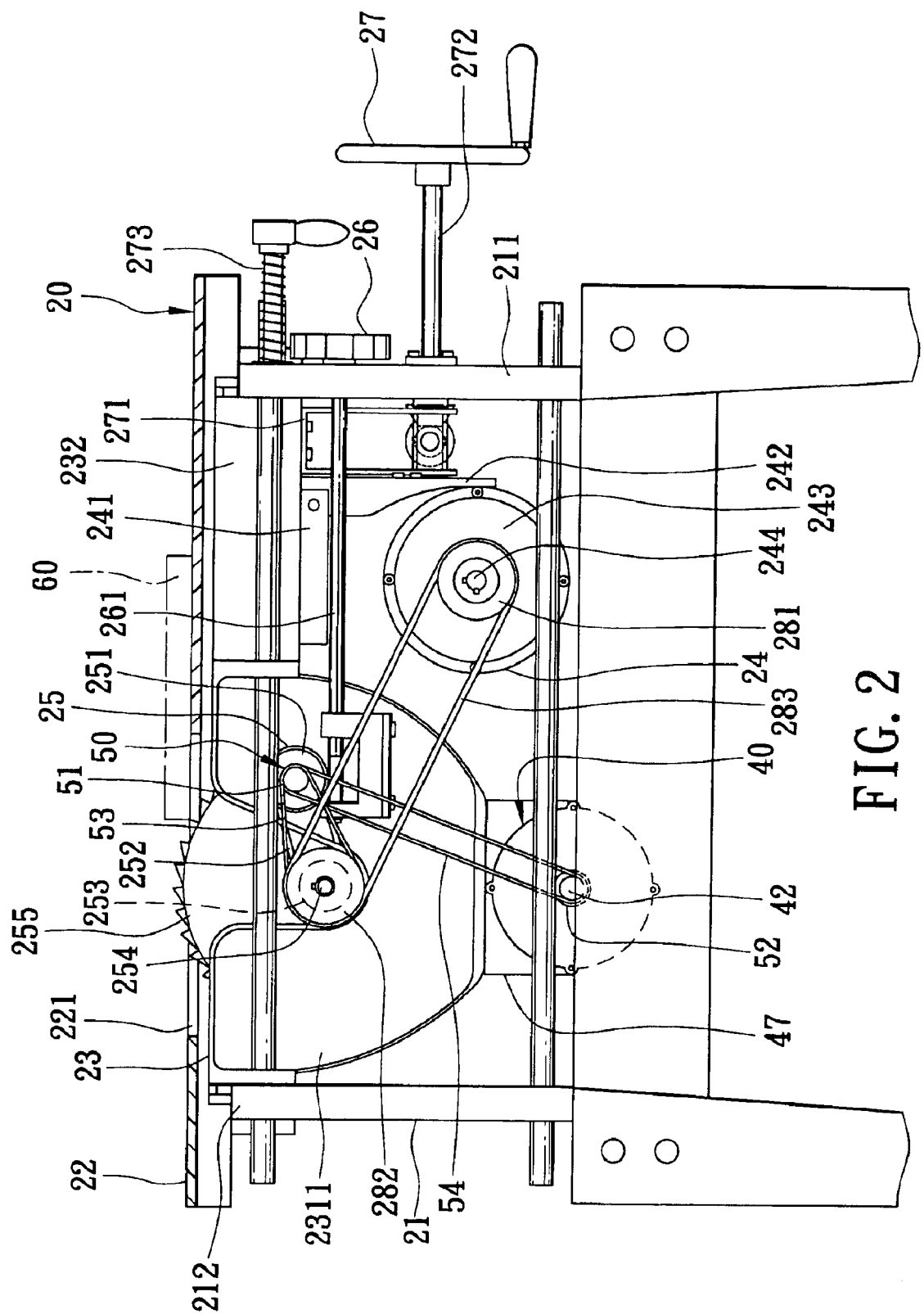
FIG. 2 is a fragmentary, partly sectioned front view of the preferred embodiment of a table saw according to this invention.
Figure 3:
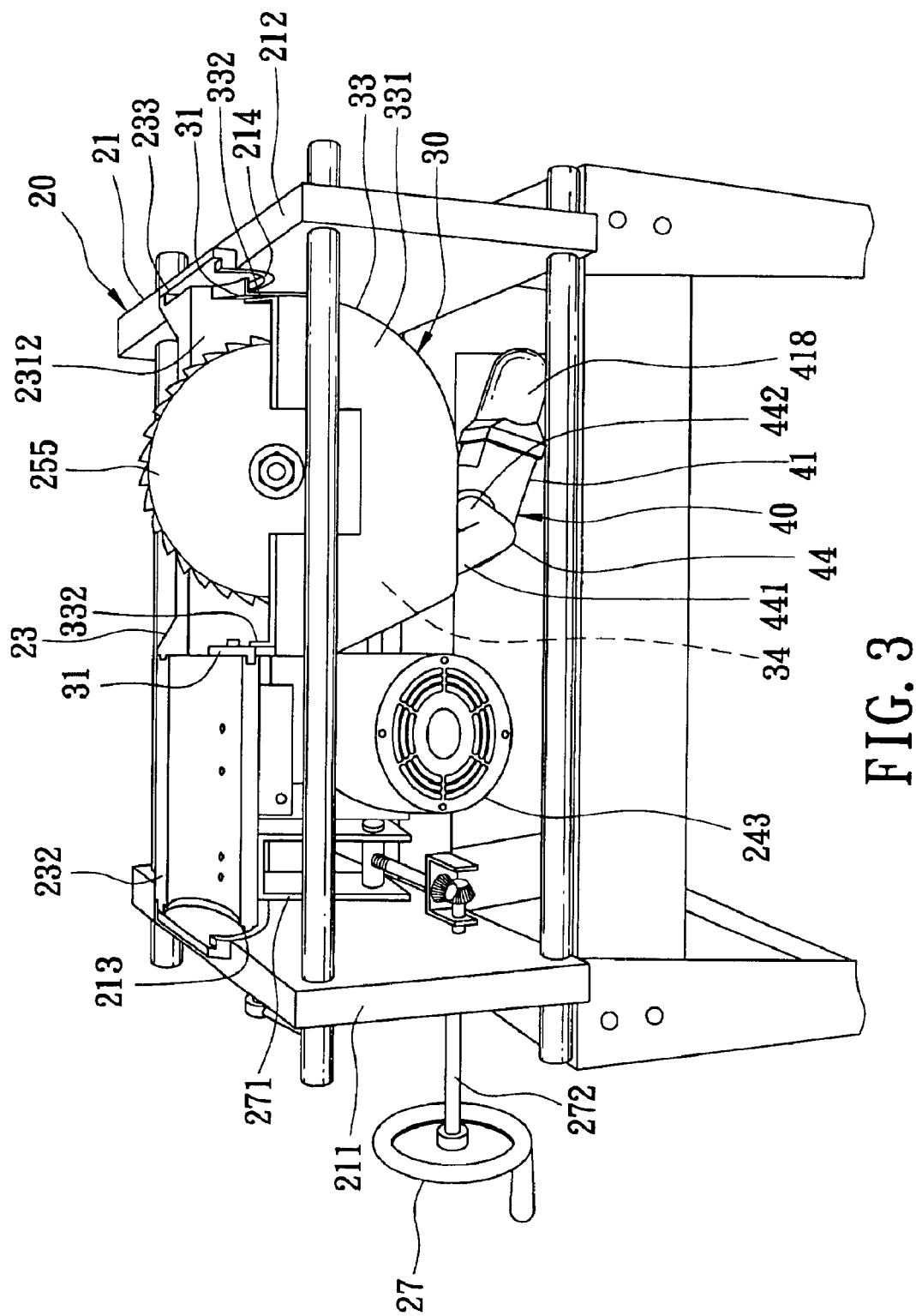
FIG. 3 is a fragmentary perspective view of the preferred embodiment viewed from a back side thereof.
Figure 4:
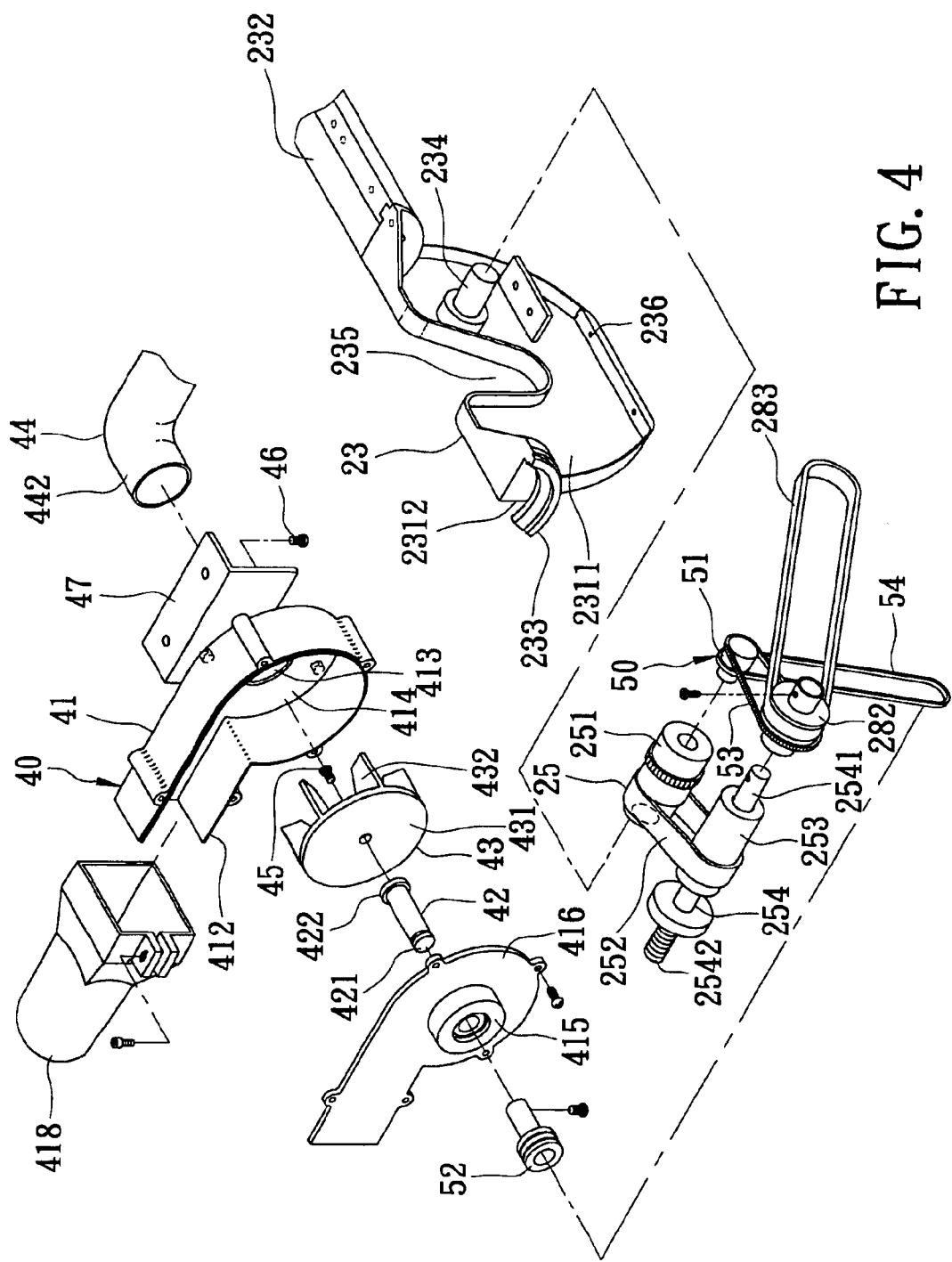
FIG. 4 is an exploded perspective view of a portion of the preferred embodiment.

Referring to FIGS. 2, 3 and 4, the preferred embodiment of a table saw 20 according to the present invention is shown to comprise a mounting frame 21, a worktable 22, a support seat 23, a power unit 24, a blade unit 25, a height adjusting unit 26, an inclination adjusting unit 27, a shaving collecting unit 30, a blowing unit 40, and a drive transmission unit 50.

The mounting frame 21 has upright first and second side frame portions 211,212 spaced apart from each other in a longitudinal direction to define an accommodation space therebetween. The first and second side frame portions 211,212 respectively have arc-shaped first and second bearing blocks 213,214 secured on inner surfaces thereof and defining sliding paths thereon, respectively, that extend in a transverse direction relative to the longitudinal direction.

The worktable 22 is turnably mounted on a top end of the first side frame portion 211 to shield or expose the accommodation space, and has an opening 221.

The support seat 23 is received movably in the accommodation space, extends in the longitudinal direction, and terminates at first and second support ends 232,233 that are respectively journalled on the first and second bearing blocks 213,214 and that are slidable relative thereto along the sliding paths. The support seat 23 has first and second major surfaces 2311,2312 opposite to each other in the transverse direction. The first major surface 2311 has a post 234 extending therefrom along a first axis in the transverse direction.

The power unit 24 includes a fixed seat 241 which is secured on the underside of the first support end 232 of the support seat 23, a swingable seat 242 which is pivoted to the fixed seat 241 about a swing axis parallel to the first axis, and a motor 243 which is secured on the swingable seat 242 and which has an output shaft 244 that extends parallel to the swing axis to deliver a driving force.

The blade unit 25 includes a spindle 251, a coupler, a blade shaft 254, and a saw blade 255.

The spindle 251 is sleeved on and is rotatable relative to the post 234 about the first axis. The coupler includes a sleeve 253 which passes through a concavity 235 defined by the support seat 23, and a linkage 252 which interconnects the spindle 251 and the sleeve 253 such that when the spindle 251 revolves about the first axis from a starting point to an end point, the sleeve 253 is turned about the first axis from a first angular position to a second angular position.

The blade shaft 254 extends through the sleeve 253 and defines a blade axis parallel to the first axis. The blade shaft 254 is turned about the first axis together with the sleeve 253, and has a driven end 2541 and a mount end 2542 disposed opposite to each other along the blade axis and outwardly of the first and second major surfaces 2311,2312, respectively. The driven end 2541 is coupled to the output shaft 244 of the motor 243 by means of a belt-and-pulley mechanism so as to be driven by the driving force of the output shaft 244 to revolve about the blade axis. The belt-and-pulley mechanism includes pulleys 281,282 respectively mounted on the output shaft 244 and the driven end 2541, and a belt 283 trained on the pulleys 281,282. The saw blade 255 is secured to and rotates with the mount end 2542 of the blade shaft 254.

The height adjusting unit 26 includes a height adjusting rod 261 mounted rotatably on the first side frame portion 211, and coupled to the spindle 251 by means of a worm and worm gear mechanism so as to rotate the spindle 251 about the first axis, thereby permitting angular movement of the blade shaft 254 to change the height position of the saw blade 255 relative to the worktable 22.

The inclination adjusting unit 27 includes a mounting seat 271 secured on the underside of the first support end 232, and an operating rod 272 disposed to be rotated manually to move the mounting seat 271 so as to move the support seat 23 along the sliding paths, thereby changing the angular position of the saw blade 255 relative to the worktable 22.

A fastening member 273 is disposed to releasably fasten the first support end 232 to the first side frame portion 211.

Figure 6:
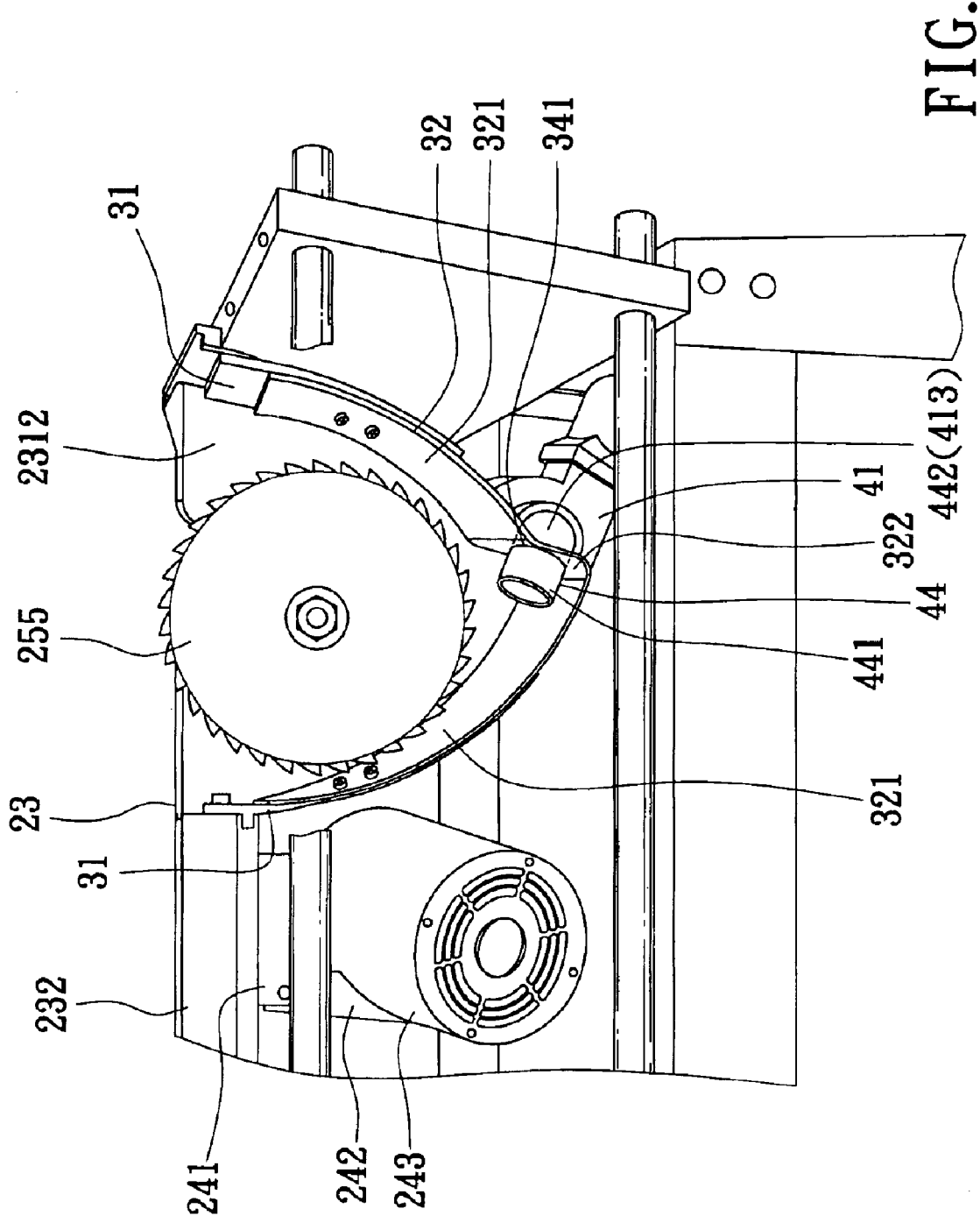
FIG. 6 is a fragmentary perspective view of the preferred embodiment, showing a shaving collecting unit with a side plate thereof removed.

With reference to FIGS. 3, 4 and 6, the shaving collecting unit 30 is secured on the underside of the support seat 23, and includes a shaving collecting member which is disposed in the vicinity of the saw blade 255, and which includes two fixed blocks 31 extending from the second major surface 2312 of the support seat 23, and a lower barrier wall 32 and a side barrier wall 33 secured on the fixed blocks 31 and disposed beneath and laterally of the saw blade 255, respectively. The lower barrier wall 32 is substantially U-shaped, and has two side walls 321 fastened to the fixed blocks 31, and a bottom wall 322 interconnecting the side walls 321 and coterminous with the second major surface 2312. The side barrier wall 33 has a face plate 331 coterminous with the lower barrier wall 32, and two side plates 332 extending from two sides of the face plate 331 and secured to the fixed blocks 31 or the side walls 321, respectively. Therefore, the second major surface 2312, the lower barrier wall 32, and the side barrier wall 33 cooperatively define a shaving collecting chamber 34 for collecting wood shavings. The shaving collecting chamber 34 has an outlet port 341 (see FIG. 6).

Figure 5:
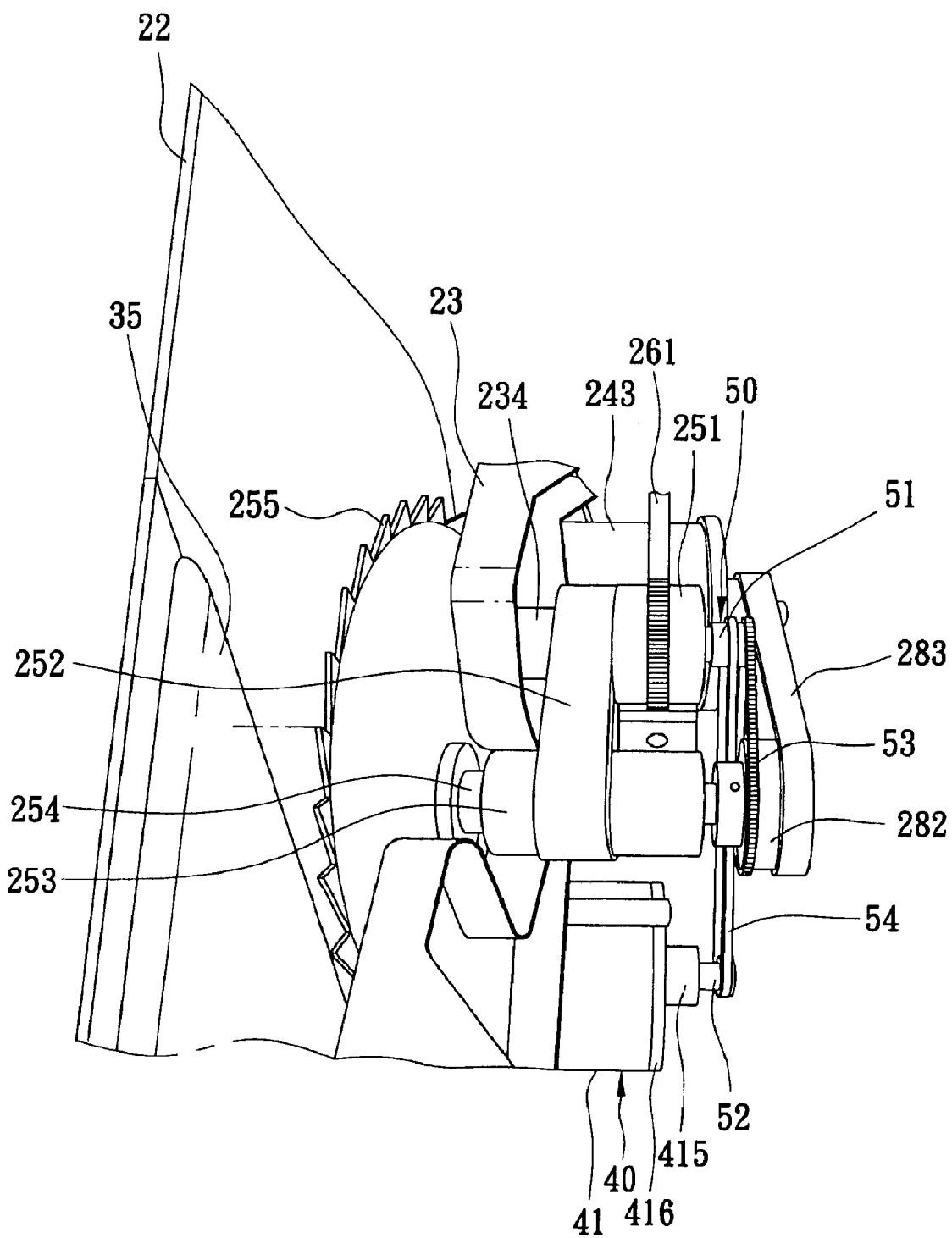
FIG. 5 is a fragmentary perspective view of the preferred embodiment, showing a power unit, a drive transmission unit, and a worktable which is in a turned state.

Preferably, as shown in FIG. 5, the shaving collecting unit 30 further includes a barrier block 35 secured on the worktable 22 and disposed outwardly of a top segment of the saw blade 255 so as to guide flying shavings into the shaving collecting chamber 34.

The blowing unit 40 includes a casing 41, a driven shaft 42, an impeller 43, and a connecting tube 44.

The casing 41 has an L-shaped seat 47 which is fastened to an underside 236 of the support seat 23 by screw fasteners 46, a proximate wall 414 which is secured on the L-shaped seat 47 and which is provided with an inlet port 413, a distal wall 416 which is spaced apart from the proximate wall 414 along a second axis parallel to the first axis to define a shaving accommodation chamber 417 (see FIG. 8) therebetween and which is provided with a bearing seat 415, and a discharge port 412 which is disposed between the proximate and distal walls 414,416 and which extends radial to the second axis. Preferably, referring to FIG. 7, a connecting head 418 is connected to the discharge port 412 and a shaving bag 70, thereby resulting in convenient disposal of the collected shavings.

Figure 7:
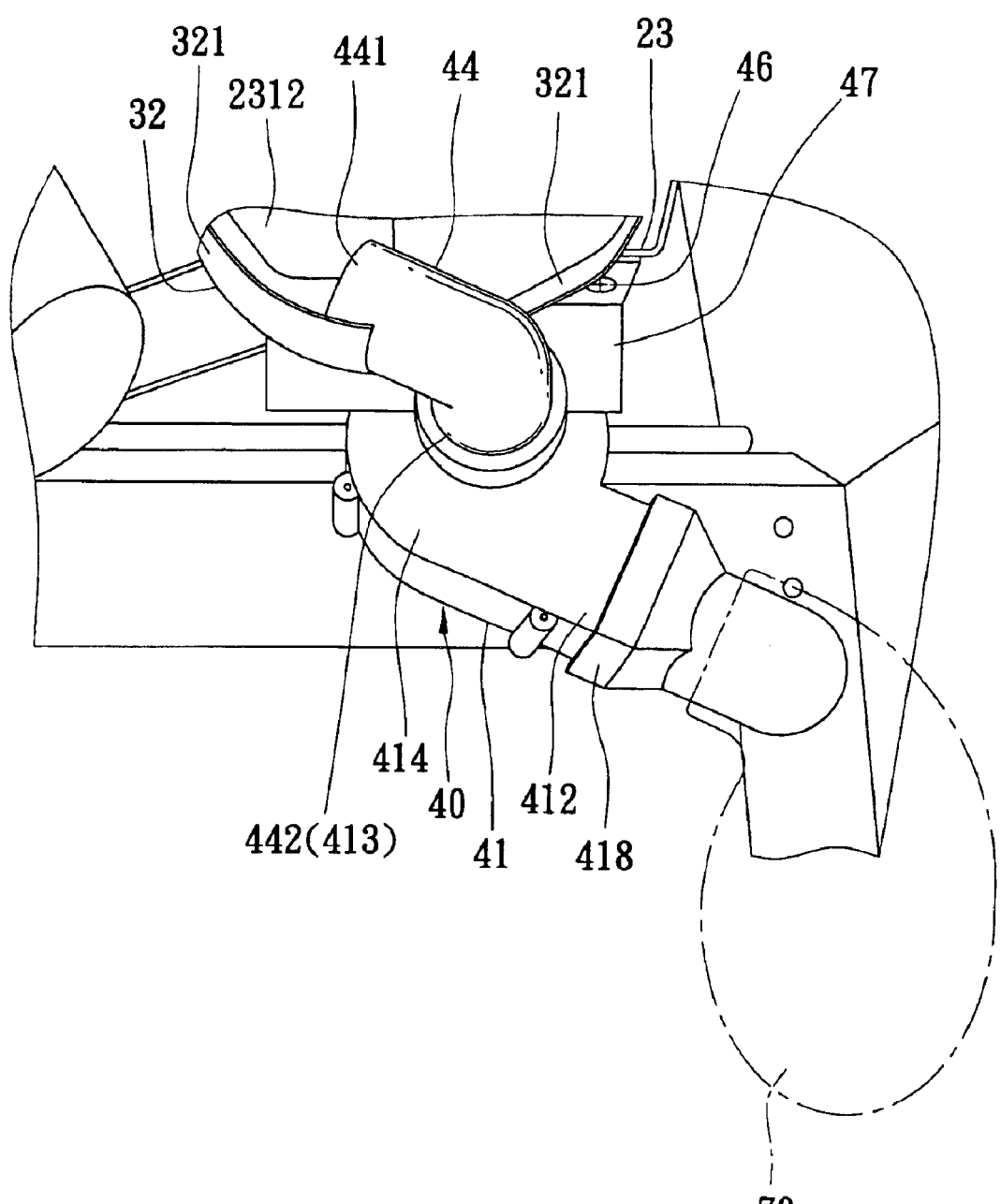
FIG. 7 is a fragmentary perspective view of the preferred embodiment, showing a blowing unit mounted on an underside of a support seat.

With reference to FIGS. 6 and 7, the connecting tube 44 defines a duct therethrough, and has two ends 441,442 which are connected to the outlet port 341 of the shaving collecting chamber 34 and the inlet port 413 of the proximate wall 414 so as to communicate the shaving collecting chamber 34 with the shaving accommodation chamber 417.

The driven shaft 42 is mounted rotatably on the bearing seat 415, and extends along the second axis. The driven shaft 42 has an inner shaft end 422 which extends into the shaving accommodating chamber 417, and an outer shaft end 421 which extends from the inner shaft end 422 and outwardly of the bearing seat 415.

The impeller 43 is received in the shaving accommodating chamber 417, and includes a connecting plate 431 which is secured on the inner shaft end 422 of the driven shaft 42 by a screw 45 so as to be driven by the driven shaft 42 to rotate a plurality of fins 432 on the connecting plate 431 about the second axis.

With reference to FIGS. 2, 4 and 5, the drive transmission unit 50 includes a rotating member 51 which is mounted coaxially on and rotatable relative to the spindle 251 about the first axis, a first belt 53 which is trained on the first pulley 282 on the driven end 2541 of the blade shaft 254 and the rotating member 51 so as to permit rotation of the rotating member 51 when the blade shaft 254 revolves, a second pulley 52 which is mounted on and which is rotated with the outer shaft end 421 of the driven shaft 42, and a second belt 54 which is trained on the rotating member 51 and the second pulley 52 so as to permit rotation of the driven shaft 42 when the rotating member 51 rotates. As such, a revolving force of the blade shaft 254 can be transmitted to the outer shaft end 421 of the driven shaft 42 for rotating the driven shaft 42 about the second axis when the motor 243 is in operation, thereby rotating the fins 432 of the impeller 43 about the second axis.

Figure 8:
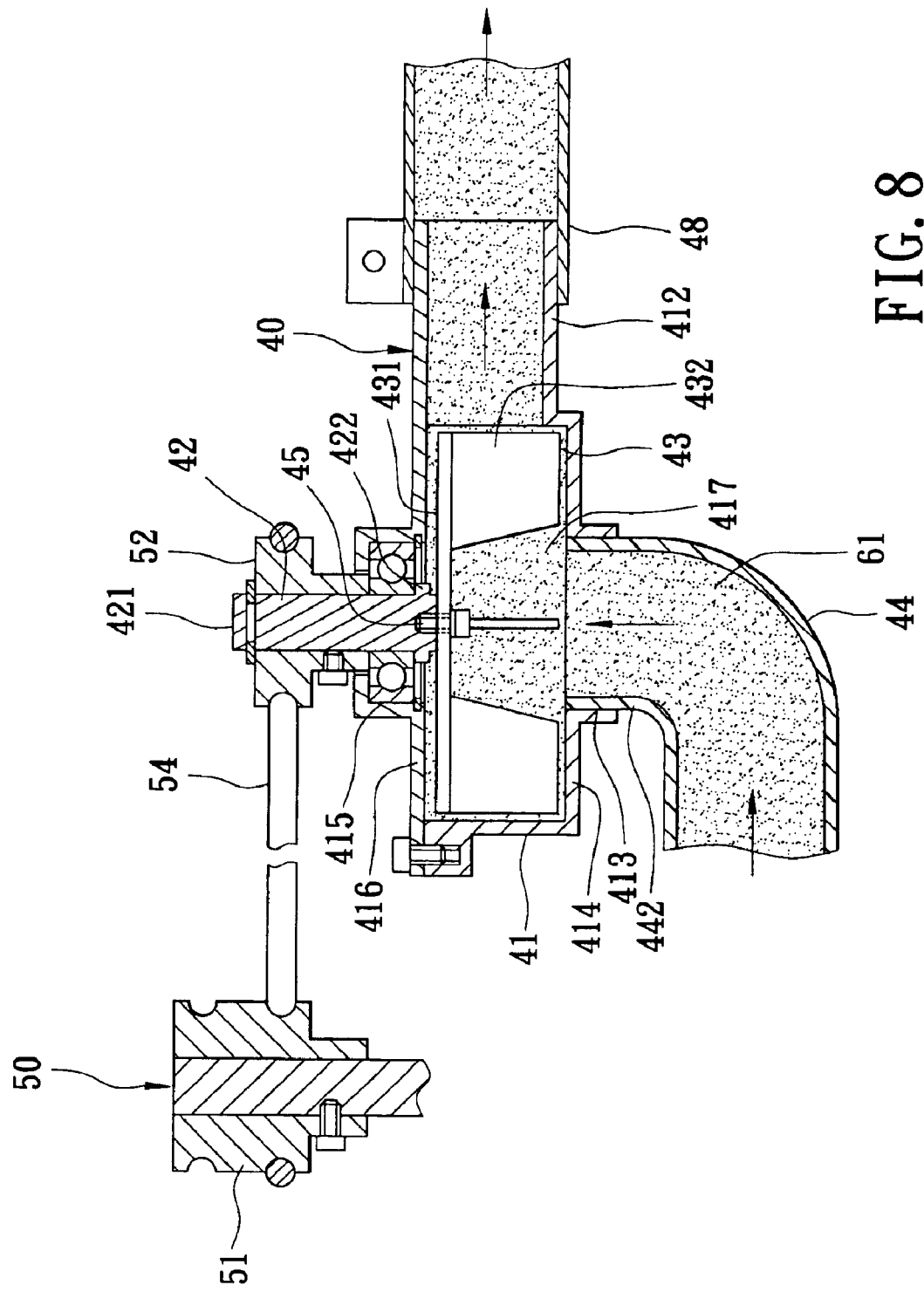
FIG. 8 is a fragmentary, partly sectioned view showing how wood shavings are drawn out of the blowing unit.

Thus, as shown in FIGS. 2, 7 and 8, during a sawing operation, a workpiece 60 is put on the worktable 22, and the motor 243 is in operation such that the saw blade 255 and the impeller 43 are rotated. Wood shavings 61 can be collected in the shaving collecting chamber 34 (see FIG. 3), and can then be drawn from the shaving collecting chamber 34 to the shaving accommodation chamber 417 through the duct of the connecting tube 44, and out of the discharge port 412.

It is noted that since the shaving collecting unit 30, the blowing unit 40, and the drive transmission unit 50 are mounted on the support seat 23, the process of collecting shavings will not be obstructed even when the angular position of the saw blade 255 is adjusted.

Furthermore, the driven shaft 42 is driven indirectly by the motor 243. Therefore, an additional power unit is not required.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A table saw comprising:
   a mounting frame having first and second side frame portions spaced apart from each other in a longitudinal direction to define an accommodation space therebetween;
   a worktable mounted on one of said first and second side frame portions to shield said accommodation space;
   a support seat which is received in said accommodation space, which extends in the longitudinal direction, and which terminates at first and second support ends that are respectively mounted on said first and second side frame portions, said support seat having first and second major surfaces opposite to each other in a transverse direction relative to the longitudinal direction;
   a motor disposed to be swingable relative to said support seat about a swing axis extending in the transverse direction, and having an output shaft disposed to deliver a driving force and extending parallel to the swing axis;
   a blade shaft defining a blade axis parallel to the swing axis, and disposed to be turnable relative to said support seat about a first axis parallel to the blade axis, said blade shaft having a driven end coupled to said output shaft so as to be driven by the driving force to revolve about the blade axis, and a mount end opposite to said driven end along the blade axis, said driven and mount ends being disposed proximate to said first and second major surfaces, respectively;
   a saw blade mounted for rotation with said mount end of said blade shaft;
   a shaving collecting member disposed in the vicinity of said saw blade, and cooperating with said second major surface to define a shaving collecting chamber for collecting wood shavings, said shaving collecting chamber having an outlet port;
   a casing having a proximate wall provided with an inlet port which is communicated with said output port, a distal wall spaced apart from said proximate wall along a second axis parallel to the first axis to define a shaving accommodation chamber therebetween, and a discharge port disposed between said proximate and distal walls and extending radial to the second axis;
   a driven shaft rotatably mounted on said distal wall, extending along the second axis, and having an inner shaft end which extends into said shaving accommodating chamber, and an outer shaft end which extends from said inner shaft end and outwardly of said distal wall;
   a drive transmission unit including a rotating member which is rotatable relative to said support seat about the first axis and which is disposed to couple said blade shaft to said outer shaft end of said driven shaft so as to transmit revolving force of said blade shaft to said outer shaft end for rotating said driven shaft about the second axis when said motor is in operation; and
   an impeller received in said shaving accommodating chamber, and driven by said inner shaft end of said driven shaft to rotate about the second axis so as to draw wood shavings from said shaving collecting member into said shaving accommodating chamber and out of said discharge port.

2. The table saw of claim 1, further comprising:
   a spindle mounted on and rotatable relative to said support seat about the first axis; and
   a coupler disposed to couple said spindle to said blade shaft such that when said spindle revolves about the first axis from a starting point to an end point, said blade shaft is turned about the first axis from a first angular position to a second angular position;
   said rotating member being mounted coaxially on and being rotatable relative to said spindle about the first axis.

3. The table saw of claim 2, wherein said drive transmission unit further includes
   a first pulley mounted on and rotatable with said driven end of said blade shaft,
   a first belt trained on said first pulley and said rotating member so as to permit rotation of said rotating member when said blade shaft rotates,
   a second pulley mounted on and rotatable with said outer shaft end of said driven shaft, and
   a second belt trained on said rotating member and said second pulley so as to permit rotation of said driven shaft when said rotating member rotates.

4. The table saw of claim 3, further comprising a connecting tube defining a duct therethrough, and interconnecting said outlet port of said shaving collecting chamber and said inlet port of said proximate wall so as to communicate said shaving collecting chamber with said shaving accommodation chamber.

5. The table saw of claim 2, wherein said first and second support ends of said support seat are journalled on said first and second side frame portions, respectively, and are slidable relative thereto along a sliding path which extends in the transverse direction and which is configured such that displacement of said support seat relative to said mounting frame along the sliding path changes an angular position of said saw blade relative to said worktable.

* * * * *